United States Patent Office 2,715,588
Patented Aug. 16, 1955

2,715,588

LEATHERLIKE PRODUCTS AND PREPARATION OF SAME

Boynton Graham, Claymont, Del., and John Augustus Piccard, Swarthmore, Pa., assignors to E. I. du Pont de Nemours & Company, Wilmington, Del., a corporation of Delaware No Drawing. Application December 16, 1952,
Serial No. 326,360

12 Claims. (Cl. 117—65)

This invention relates to leather-like products and their preparation and, more particularly, to such products embodying fibers of synthetic linear condensation polymers.

An object of the present invention is to provide a leather-like product which is acceptable as a substitute generally for leather. A more specific object is to provide a leather-like product which is acceptable as a leather substitute in those protective clothing outlets calling for the ability of the product to breathe. A further object is to provide an economical and practical process of preparing such leather-like product. Other objects will be apparent from the description of the invention given hereinafter.

The above objects are accomplished according to the present invention by forming a product essentially comprising, by weight, 40% to 85% of matted, i. e., non-woven, oriented fibers of a synthetic linear condensation polymer and, distributed therethrough, 60% to 15% of a polymeric binder chemically dissimilar to the linear condensation polymer, incompatible therewith, and melting below the softening temperature thereof, the product containing a volume percent of interconnecting void space distributed therethrough at least equal to 3000 (weight percent fiber)$^{-1}$—30 and not greater than 70%.

The invention further comprises a process of preparing a leather-like product which comprises forming a mat of non-woven, oriented fibers of a synthetic linear condensation polymer with a polymeric binder distributed therethrough, said polymeric binder being chemically dissimilar to said linear condensation polymer, incompatible therewith, and melting below the softening temperature thereof, and the mat having a bulk density of less than about 0.5 in the absence of polymeric binder, and pressing said mat at a temperature above the flow temperature of the polymeric binder but below the softening temperature of the linear condensation polymer until a product is formed containing a volume percent of interconnecting void space distributed therethrough at least equal to 3000 (weight percent fiber)$^{-1}$—30 and not greater than 70%.

To a degree heretofore unattained in a synthetic product, the product as defined above combines the essential properties of leather, i. e., permeability to water vapor, flex life, resistance to penetration by liquid water, tear strength, tensile strength, elongation, and drape and feel. The present invention resides to a considerable extent in the discovery that there are several closely interrelated composition factors and limits therefor which must be observed to attain a leather-like product acceptable as a leather substitute where ability to breathe is essential, e. g., as in gloves, outer suitings, shoe uppers, and similar protective clothing articles. Wearing comfort in hot or temperate climates depends on water vapor permeability and it has been found that the latter in the instant product depends on both void content and the fiber/binder ratio of the product. Bulk density, which is a measure of void content, can be governed by controlling the degree of consolidation of the fiber/binder blend and, hence, given a suitable fiber/binder ratio in the blend, then the void content and, therefore, the water vapor permeability and the desired and critical end property of wearing comfort, can be similarly governed.

This partial consolidation of the mat of non-woven fibers of synthetic linear condensation polymer with the polymeric binder distributed therethrough also affects other important physical properties of the product. Too little consolidation gives a product whose stretch and pliability are largely that of the porous non-woven fibers and are, hence, too limp and too weak for satisfactory use in leather outlets. Conversely, too much consolidation results in the formation of end products which are too stiff and brittle to be of any utility in these outlets, to say nothing of their lack of ability to breathe. The above presented equation interrelating the void space and the weight percent of fiber, together with the indicated limits on the fiber/binder ratio, defines the optimum degree of consolidation for preparing comfortable, tough, leather-like products directly from the intermediate fibers and binders.

The leather-like products of this invention have wearing comfort equal or superior to natural leathers, can be prepared by mixing fibers of a synthetic linear condensation polymer with a chemically dissimilar polymeric binder and subsequently partially consolidating the mixture under controlled conditions of temperature and pressure. The mixing of the two components can be carried out by simply impregnating a porous, non-woven mat, web or felt of the synthetic linear condensation polymer fibers with a solution or dispersion of the chemically dissimilar polymeric binder, or in those instances where fibrous or particulate forms of the polymeric binder are used, by simple mixing such as that achieved in conventional carding procedures or the like. It is only necessary that there be formed a mat of the fibers with the polymeric binder distributed therethrough, the mat prior to impregnation with the binder having a bulk density of less than about 0.5 and, preferably, less than 0.3 g./cc. so as to permit appreciable consolidation under heat and pressure during the pressing step to arrive at the desired volume percent of interconnecting void space.

An important factor in the present invention is the type of structural fiber used. It is restricted to the oriented fibers of the synthetic linear condensation polymers such as the dibasic acid/diamine or amino acid polyamides, the dibasic acid/diol or hydroxy acid polyesters, or the intermixed polyester/polyamide products, well known in the art and described in detail in for instance U. S. Patents 2,071,250, 2,071,251, 2,071,253, 2,130,948, 2,224,037, and 2,572,844. Because of greater toughness and higher softening points, those polymers having only one recurring condensation unit, i. e., the polymers from a single amino or hydroxy acid or from a single diamine or diol and a single dicarboxylic acid are preferred.

The length of the fibers used as the structural fiber component of the instant products can vary, in general, from as little as 10 mils, i. e., 0.01 inch, up to 8 inches or longer. It is preferred to use fibers ranging in length from 0.5 to 4.0 inches. The non-woven mats used in preparing the instant products will usually be made by carding techniques, especially with fiber lengths 1.5 inches or greater. Fibers substantially within the range of 2.0 to 2.5 inches are most preferred as being better adapted for handling by the carding technique and giving products of optimum properties.

The denier of the structural fiber component can vary widely. It can be as great as 20 denier/filament but fibers of 1 to 3 denier/filament are preferred as they are easier to handle and give a product of greater pliability, toughness, and scuff resistance.

These structural fibers must not melt or flow at temperatures below 100° C. Because of greater strength retention with increasing temperature and therefore greater ease of handling in the partial consolidation product forming step, the preferred structural fibers will not melt or flow at temperatures below 150° C. and, preferably, 200° C.

Another important feature in the present invention is the type of polymeric binder used. This polymeric binder must be chemically dissimilar to and incompatible with the linear condensation polymer used for the structural fiber component and must melt, i. e., flow below the softening or deformation temperature thereof. It has been found that when the polymeric binder is chemically similar to the structural fiber component, the resulting product, although occasionally adequate in tensile strength, is generally deficient in drape, hand, and flex life, and, a serious defect, is usually particularly deficient in tear. A chemically dissimilar and incompatible polymeric binder is characterized in that it is incompatible in a melt with the polymer used for the structural fiber component. Thus, a polyamide fiber cannot be used in conjunction with a polyamide binder but can be used with a polyester binder, and vice versa, etc.

The polymers useful as binder components in this invention include, in the broad aspect, synthetic addition type polymers, synthetic condensation polymers provided they are chemically dissimilar to and incompatible with the fiber component, and natural and modified natural polymers, e. g., cellulose acetate and cyanoethyl cellulose. Because of their readier availability, better properties, and appreciably greater ease of handling, the preferred group of binder polymers are the addition polymers. A particularly outstanding division of this group are those addition polymers containing in combined form the ethylenically unsaturated monomers including both the mono- and diene-type monomers. Again, because of their readier availability and, in particular, because of their lower cost and more desirable polymer properties, the most outstanding of these binders are the vinylidene polymers and copolymers, including both the monoene and diene types. This class of polymers is characterized by having in each polymerizable monomer therein involved as the only polymerizable ethylenic unsaturation, terminal ethylenic groups wherein the terminal carbon is a methylene carbon, i. e., those containing one or more vinylidene ($CH_2=C<$) groups. Included in this most preferred class, which from the foregoing will obviously have a wholly carbon-polymer chain, are the great majority of commercially available addition polymers.

It is necessary that the polymeric binder melt or, at least, flow at a temperature below the softening or deformation temperature of the structural fiber component in order that the mat of unwoven fibers containing the binder may be consolidated without harm to the structural fibers. It is preferred to use as the polymeric binder synthetic addition polymers which, after suitable plasticization, if this be necessary, flow above 90° C. and at least 10° C. below the softening temperature of the structural fiber polymer and which binder polymers, in film form and suitably plasticized, exhibit tensile strengths of at least 500 lb./sq. in., preferably 1,000 lb./sq. in., elongations of at least 100%, preferably 200%, and moduli no greater than 5,000 lb./sq. in. with the product of the tensile strength and elongation being at least 100,000. For the purpose of achieving higher flex life and scuff resistance, it is usually preferred to incorporate into the binder a plasticizer therefor; suitable classes of plasticizers for these types of polymers are well known in the art.

A still further important factor in the present invention is the fiber/binder ratio. This factor has a direct bearing on the permissible range of the volume percent of interconnecting void space distributed through the product and will be determined first in preparing the leather-like product of this invention. This fiber/binder ratio can vary, on a weight basis, from 40/60 to 85/15. Beyond these limits the products have inadequate tensile and tear strength. The particular fiber/binder ratio chosen will vary as a function of the durability, drape, strength and appearance desired in the end product and will also be influenced to some extent by the economics of the materials involved. For maximum toughness in the products prepared therefrom fiber/binder ratios of 50/50 to 70/30 are preferred, particularly for shoe uppers, and an approximate 50/50 ratio is generally the optimum ratio.

The fiber/binder ratio is based on the total permanent binder content, i. e., the polymer used, plasticizer if any, and any other optional ingredients forming a permanent part of the binder. Liquid dispersion mediums, volatile solvents and the like are excluded in determining the weight of binder. While the instant products may include other optional ingredients such as dyes, pigments, and the like, these will be used in relatively minor proportions, if at all, and do not appreciably affect the essential fiber/binder ratio as set forth.

The "leather-permeability" or water vapor permeability of various products is herein reported in "leather PV" values. The leather PV values are in units of grams of water per 100 square meters per hour and were obtained in tests carried out according to a modification of the method of Kanagy and Vickers (Journal of American Leather Chemical Association 45, 211–242, April 1950). In this modification of the test, an approximately 3-inch diameter crystallizing dish is filled with 12-mesh calcium chloride and covered, using tight, non-permeable seals at the edges, with a sample of the pliable, leather-like film under test, and then suspended inverted in an atmosphere of high humidity (90% relative humidity (R. H.) at 23° C.)—the "flesh" or fibrous side, where the product had a "flesh" side and "grain" side, being outside, i. e., being presented to the atmosphere of higher humidity. The equilibrium rate of water absorption by the calcium chloride is obtained by weighing the assembly at suitable intervals, and the results reported in the units given above.

Under these conditions shoe-upper leathers usually exhibit leather permeability values within the range 2,000–18,000 gms./100 m.$^2$/hr. Based upon these values, and a considerable series of wearing-comfort tests which have been conducted, the minimum tolerable leather permeability value (leather PV) for hot weather wearing comfort of shoe uppers is about 2,000 gms./100 m.$^2$/hr., and is, preferably, 4,000–20,000. Membranes exhibiting a leather PV in this test of 2,000–10,000 will provide wearing comfort equivalent to that obtained with glazed or heavy shoe-upper leathers, and those exhibiting leather PV's of 10,000–22,000 will provide wearing comfort equivalent or superior to that obtained with the lightest shoe leathers.

For comparative purposes, various samples of representative shoe-upper leathers exhibited the following leather permeability values (leather PV) when tested in accordance with this procedure:

| | |
|---|---|
| Glazed kid | 3,718 |
| Scotch grain cow-hide | 6,161 |
| Cretan butt | 7,863 |
| English calf | 9,430 |
| Suede calf | 13,932 |

The above specific values as well as those given later for various natural leathers in other tests are not necessarily absolute representative values. This arises from the large variations between samples of the leathers, even those taken from different areas of the same hide, and, in particular for strength determinations, variations depending upon the direction relative to the sample in which the determination is made. However, the values represent the only yardstick for each property upon which to base relative evaluation. These points are discussed in greater detail in Wilson's "The Chemistry of Leather Manufacture," Chemical Catalogue Company, 1928–1929.

The Schiltknecht flex life values herein mentioned refer to the number of flexes samples of the leather-like products undergo before surface cracking when flexed at 23° C. and 50% R. H. in the Schiltknecht flex machine. This machine is described in detail in Bulletin #105 of Alfred Suter Co., 200 Fifth Avenue, New York, N. Y. These values represent a measure of the toughness of the material under constant flex, and as regards resistance to flexing represent an accelerated wear test. The higher the value reported in this test, the more resistant is the material to failure caused by flexing.

Most natural leathers exhibit relatively high Schiltknecht flex life values, probably due to their inherent good flexibility and high strength properties. English calf, regarded as an excellent natural leather, exhibits a Schiltknecht flex life of about 6,000,000.

The resistance of the synthetic, leather-like films to penetration of liquid water as set forth herein is determined in accordance with a modification of the procedure described in Federal Leather Specification, KK–L–311 Method, #271.1, dated March 28, 1945. The values reported are the total number of flexes undergone by the material before penetration by liquid water from the "grain" to the "flesh" side when flexed at 140 flexes/minute in an atmosphere of 50% R. H. at 23° C. The higher the number, the more resistant the material. For comparative purposes, representative shoe-upper leathers exhibited the following values in this test:

| | |
|---|---|
| Cretan butt | 114 |
| Suede calf | 405 |
| Scotch grain cow-hide | 2,206 |
| English calf | 8,012 |
| Glazed kid | >45,000 |
| Patent calf | >45,000 |

Tongue tear strength is herein reported in pounds and is a measure of the force necessary to continue an existing tear in the material under test. The values given are average values obtained in the manner of ASTM test procedure D39–39 using a model TTB tester manufactured by the Instron Engineering Corporation and are obtained by cutting a slit in the material to be tested and thereafter measuring the average force in pounds required to just propagate the tear.

The following values for various natural leathers are taken from page 664 of Wilson's "Modern Practice in Leather Manufacture," Reinhold, 1941:

| | Pounds |
|---|---|
| Chrome suede | 2 |
| Cordovan | 4 |
| Chrome patent kid | 4 |
| Chrome calf | 5 |
| Vegetable calf | 8 |

The tensile strength data herein represent the maximum load undergone by the sample under test when subjected to linear stress in the plane of the sample strip in an Instron Engineering Corporation Model TTB tester. These data are obtained directly in pounds and are reported in terms of lb./sq. in. to represent a direct measure of the strength of the materials to linear stress. Elongation values obtained in the same test are reported as percentage of the original length and unless otherwise indicated represent the maximum percentage elongation, i. e., break elongation, incurred in the strip sample of the material being tested.

Tensile strength and elongation values for representative samples of natural leather, as reported in Wilson's later work above at page 664 include:

| | Tensile Strength (lb./sq. in.) | Percent Elongation at Break |
|---|---|---|
| Cordovan | 1,803 | 28 |
| Chrome suede | 2,215 | 28 |
| Chrome patent kid | 3,081 | 40 |
| Chrome calf | 4,358 | 36 |
| Vegetable calf | 6,096 | 29 |

Modulus values reported are those obtained in accordance with ASTM test procedure D–638–46T and are expressed in units of lb./sq. in. These values actually are the modulus of elasticity in tension and represent a direct measure of the relative stiffness of the materials being tested—the higher the modulus the stiffer the material.

The following examples wherein all parts are by weight unless otherwise stated, illustrate specific embodiments of this invention. Examples I through XI specifically illustrate the use of various polymeric binders with synthetic linear condensation polyamide fibers; Examples XII through XIV illustrate the use of other synthetic linear condensation polymers as the fiber components, also with variance in the polymeric binder component; Examples XV through XIX illustrate variations in the fiber/binder ratio, void content, and thickness, with particular attention to compositions wherein the fiber component is a synthetic linear condensation polyamide and the binder components are various vinylidene polymers, particularly those containing halogen substituents.

EXAMPLE I

A dispersion of 3.19 parts of half-inch-long, three denier/filament polyhexamethyleneadipamide staple fibers in 16,000 parts of water containing about 0.15 part of a commercial alkylarylpolyether dispersing agent derived from ethylene oxide and an alkylphenol, was formed into a mat by deposition on a wire screen according to papermaking techniques. The size of the screen was such as to give a fiber weight of about 6.0 oz./sq. yd. The dried mat was impregnated with 54 parts of a 5.9% dispersion in toluene of a 100/10/20/20/2/3/0.5 blend of chlorosulfonated polyethylene/wood rosin/tribasic lead maleate/titanium dioxide/aluminum stearate/2 - mercaptobenzothiazole/diphenylguanidine. The fresly-impregnated mat (50/50 fiber/binder) was coagulated by submerging in methanol, air dried, and pressed for 10 minutes at 170° C., and 1200 lb./sq. in. pressure. There was thus obtained a pliable, leather-like, air-permeable product which exhibited a leather PV of 7829, a tensile strength of 8595 lb./sq. in., an elongation of 24%, a modulus of 60,102 lb./sq. in., a tongue tear strength of 6.0 pounds, and resisted 14,905 flexes before allowing the penetration of liquid water and 128,260 Schiltknecht flexes before surface cracking.

EXAMPLE II

Two polyhexamethyleneadipamide staple fiber mats prepared as described in Example I, were plied and impregnated with an equal weight (50/50 fiber/binder ratio) of a 100/60 blend of a 95/5 vinyl chloride/vinyl acetate copolymer and di-2-ethylhexyl phthalate plasticizer, dispersed at 9.4% concentration in methyl ethyl ketone. The impregnated, plied mat was coagulated in water, dried, pressed for 10 minutes at 160° C. and 1400 lb./sq. in., using 60 mil shims, and finally split down the middle at the ply line provided by the juncture of the initial plies. There was thus obtained a 30 mil thick tough, permeable, leather-like product of about 50% void space and weighing about 13.0 oz./sq. yd., which exhibited a leather PV of 2328, an average resistance to penetration by liquid water of 483 flexes and a Schiltknecht flex life of 484,500.

EXAMPLE III

Mats plied as in Example II were impregnated with an equal weight (50/50 fiber/binder ratio) of a blend of a commercial polychloroprene (prepared in accordance with U. S. 2,567,117), zinc oxide, magnesium oxide, and a commercial phenylnaphthylamine rubber antioxidant in a 100/10/10/2 ratio, dispersed at 9.8% concentration in benzene. The freshly-impregnated, plied mat was coagulated in methanol, dried, and pressed 40 minutes at 155° C. and 200 lb./sq. in., using 60 mil shims. After splitting along the ply line, there was obtained a permeable, pliable, leather-like product about 30 mils thick, weighing about 16.9 oz./sq. yd., and containing about 45% void space, which exhibited a leather PV of 8285, a liquid water penetration resistance of 186 flexes, a tensile strength of 5471 lb./sq. in., an elongation of 31%, a modulus of 29,070 lb./sq. in., a tongue tear strength of 17.5 pounds, and a Schiltknecht flex life of 28,500.

EXAMPLE IV

Mats plied as in Example II were impregnated with an equal weight (50/50 fiber/binder ratio) of a 100/60 polyvinyl chloride/di-2-ethylhexyl phthalate plasticizer blend, dispersed at 7.8% concentration in a 98.1/1.9 tetrahydrofuran/dimethylformamide solvent mixture. The freshly-impregnated, plied mat was coagulated in water, dried, and pressed 10 minutes at 160° C. and 200 lb./sq. in., using 60 mil shims. After splitting, there was obtained a pliable, permeable, leather-like product about 30 mils thick, weighing about 9.5 oz./sq. yd., and containing about 56% void space, which exhibited a leather PV of 7096, a liquid water penetration resistance of 494 flexes, a tensile strength of 1827 lb./sq. in., an elongation of 19%, a modulus of 15,855 lb./sq. in., a tear strength of 7.0 pounds, and a Schiltknecht flex life of 156,750.

EXAMPLE V

A mat of 2.5 inches long, three denier/filament polyhexamethyleneadipamide staple was prepared on a card, at a weight of 7.45 oz./sq. yd. This was supported on a screen and submerged in a 4% dispersion of a 100/60 polyvinyl chloride/di-2-ethylhexyl phthalate plasticizer blend in 99/1 tetrahydrofuran/dimethylformamide solvent mixture. Excess solution was allowed to drain from the impregnated mat, the mat was sprayed with water, submerged in water, dried, and plied with another similarly impregnated mat. The plied, impregnated mats were pressed 10 minutes at 160° C. and 156 lb./sq. in., using 70 mil shims and finally split down the middle. There was thus obtained a pliable, permeable, leather-like product, 35 mils thick, with a 48/52 fiber/binder ratio, a void content of 45% and weighing 16.8 oz./sq. yd., which exhibited a Schiltknecht flex life of 3,961,000, a leather PV of 5716, a liquid water penetration resistance of 14,416 flexes, a tensile strength of 2176 lb./sq. in., a break elongation of 94%, a modulus of 5462 lb./sq. in., and a tongue tear strength of 16.0 pounds.

Comparison with the foregoing examples makes evident the over-all improvement in properties achieved when the longer staple fibers are used.

EXAMPLE VI

A mat was prepared as described in Example I, using 0.375 inch long, one denier/filament polyhexamethyleneadipamide staple. Two such mats were plied and impregnated with an equal weight (50/50 fiber/binder ratio) of a 100/60 polyvinyl chloride/dioctyl phthalate plasticizer blend dispersed at 8.3% concentration in a 98/2 tetrahydrofuran/dimethylformamide solvent mixture. After coagulating in water and drying, the material was pressed 10 minutes at 160° C. and 156 lb./sq. in., using 60 mil shims, and finally split on the ply line. There was thus obtained a 30 mil thick, pliable, permeable, leather-like product, with a 51% void content and weighing 13.3 oz./sq. yd., which exhibited a Schiltknecht flex life of 2,821,000–6,697,000, a leather PV of 10,782, a tensile strength of 2668 lb./sq. in., an elongation of 32%, a modulus of 18,120 lb./sq. in., and a tongue tear strength of 7.0 pounds.

Comparison with the foregoing examples makes evident the over-all improvement in properties achieved, even with short fibers, when finer fibers are used.

EXAMPLE VII

Plied mats as described in Example II were impregnated with an 8.3% dispersion of a 2.36/1 ethylene/vinyl acetate copolymer in toluene to give a fiber/binder ratio of 78/22. The plied, impregnated mats were dried three hours at 60° C., pressed 10 minutes at 165° C. and 156 lb./sq. in., using 60 mil shims, and finally split along the ply line. There was thus obtained a pliable, permeable, leather-like product about 30 mils thick with about a 56% void content and weighing 9.4 oz./sq. yd., which exhibited a Schiltknecht flex life of 3,082,000 and a leather PV of 17,820.

EXAMPLE VIII

Plied mats as described in Example II were impregnated with an equal weight (50/50 fiber/binder ratio) of a 2.9/0.87/0.13 ethylene/vinyl alcohol/vinyl aceate copolymer, i. e., a 2.9/1.0 ethylene/vinyl acetate copolymer in which 87% of the acetate groups have been hydrolyzed to hydroxy groups, dispersed at 7.8% concentration in a 2/1 benzene/ethanol solvent mixture. The freshly-impregnated plied composition was coagulated in water, dried, pressed 10 minutes at 160° C. and 156 lb./sq. in., using 60 mil shims, and finally split on the ply line. There was thus obtained a 30 mil thick, pliable, permeable, leather-like product with about a 48% void content, and weighing 14.0 oz./sq. yd., which exhibited a Schiltknecht flex life of 47,000–185,000, a leather PV of 3500, a tensile strength of 6356 lb./sq. in., a break elongation of 42%, and a modulus of 30,303 lb./sq. in.

EXAMPLE IX

Plied mats as described in Example II were preheated to 65° C. and impregnated at 65° C. with an equal weight (50/50 fiber/binder ratio) of a 2.9/1 ethylene/vinyl alcohol copolymer dispersed at 8.3% concentration in a 2/1 benzene/ethanol solvent mixture. After coagulation in water, the plied, impregnated mats were dried and pressed 10 minutes at 160° C. and 156 lb./sq. in., using 60 mil shims, and finally split along the ply line. There was thus obtained a pliable, permeable, leather-like product about 30 mils thick with about a 40% void content, and weighing 11.8 oz./sq. yd., which exhibited a Schiltknecht flex life of 38,000, a leather PV of 3992, a tensile strength of 4297 lb./sq. in., an elongation of 29%, and a modulus of 50,392 lb./sq. in.

EXAMPLE X

Mats plied as in Example II were impregnated with an equal weight (50/50 fiber/binder ratio) of a 70/30 polyvinylbutyral/dibutyl sebacate blend dispersed at 8.2% concentration in dioxane. After coagulation in water and drying, the plied impregnated mats were pressed for 10 minutes at 155° C. and 156 lbs./sq. in., using 60 mil shims, and finally split along the ply line. There was thus obtained a pliable, permeable, leather-like product about 30 mils thick with about a 53% void content, and weighing 15.3 oz./sq. yd., which exhibited a Schiltknecht flex life of 712,000, a leather PV of 10,984, a tensile strength of 2379 lb./sq. in., an elongation of 21%, a modulus of 16,750 lb./sq. in., and a tongue tear strength of 6.5 pounds.

EXAMPLE XI

Mats plied as in Example II were impregnated with an equal weight (50/50 fiber/binder ratio) of a 75/25 blend of an about 83/17 vinylidene chloride/acrylonitrile copolymer and di-2-ethylhexyl phthalate plasticizer dispersed at 7.9% concentration in water. After air drying, the plied impregnated mats were pressed for 10 minutes at 140° C., and 156 lb./sq. in., using 60 mil shims, and finally split along the ply line. There was thus obtained a 32 mil thick, pliable, very permeable, leather-like product weighing 10.2 oz./sq. yd., with about a 65% void content which exhibited a Schiltknecht flex life of 214,000 and a tongue tear strength of 3.2 pounds.

EXAMPLE XII

Mats were prepared as described in Example I, using half-inch long, three denier/filament poly-epsilon-aminocaproic acid staple yarn. Two such mats were plied and impregnated with the chlorosulfonated polyethylene composition described in Example I to give a fiber/binder ratio of 56/44. After coagulating in methanol and drying, the plied impregnated mats were cured 10 minutes at 170° C. and contact pressure (ca. 16 lb./sq. in.) and finally separated at the ply line. The 20 mil thick, pliable, permeable, leather-like product, weighing 10.2 oz./sq. yd., and with about a 46 void content, thus obtained exhibited a Schiltknecht flex life of 78,000–342,000, a leather PV of 10,012, a liquid water penetration resistance of greater than 50,000 flexes, a tensile strength of 6418 lb./sq. in., an elongation of 47%, a modulus of 20,755 lb./sq. in., and a tongue tear strength of 12.0 pounds.

EXAMPLE XIII

Mats were prepared as in Example I, using three denier/filament, half-inch long polyethylene terephthalate polyester staple. Two such mats were plied and impregnated with about an equal weight (50/50 fiber/binder ratio) of the chlorosulfonated polyethylene composition described in Example I. After coagulating the binder in methanol, drying, and curing the plied impregnated mats 10 minutes at 170° C. and contact pressure, the product was split. The 28-mil thick, pliable, permeable, leather-like product thus obtained, weighing 15.2 oz./sq. yd. with a void content of about 43%, exhibited a Schiltknecht flex life of 78,000, a leather PV of 15,529, a liquid water penetration resistance of greater than 25,000 flexes, a tensile strength of 4073 lb./sq. in., an elongation of 28%, a modulus of 64,204 lb./sq. in., and a tongue tear strength of 8.2 pounds.

EXAMPLE XIV

Mats prepared as in Example XIII were impregnated with plasticized polyvinyl chloride as described in Example IV, to give a fiber/binder ratio of 56/44. After coagulating, drying, pressing, and splitting as in Example IV there was obtained a pliable, permeable, leather-like product about 30 mils thick, weighing 13.5 oz./sq. yd. with about a 40% void content which exhibited a Schiltknecht flex life of 399,000–3,277,000, a leather PV of 12,673, a liquid water penetration resistance of 7856 flexes, a tensile strength of 5858 lb./sq. in., a break elongation of 35%, a modulus of 72,464 lb./sq. in., and a tongue tear strength of 8.5 pounds.

EXAMPLE XV

A mat was prepared as described in Example I and impregnated with plasticized polyvinyl chloride as in Example IV to give a fiber/binder ratio of 44/56. After quenching and drying, the impregnated mat was pressed 10 minutes at 160° C. and 848 lb./sq. in., using 35 mil shims. There was thus obtained a 32 mil thick, pliable, permeable, leather-like product weighing 15.6 oz./sq. yd., with a 46% void content which exhibited a tensile strength of 3261 lb./sq. in., an elongation of 35%, a modulus of 12,870 lb./sq. in., and a tongue tear strength of 8.0 pounds.

Similar experiments carried out under varying conditions led to the formation of similar pliable, permeable, leather-like products with widely varying properties. Data on these experiments in which the polyhexamethyleneadipamide mats were prepared as in Example I and impregnated with plasticized polyvinyl chloride as in Example IV are given in Table I. All pressings were for 10 minutes at 160° C. and the pressures indicated, using shims to prevent complete consolidation. In some instances, as indicated, two or more mats were plied and the product split after pressing.

*Table I*

|   | Fiber/Binder | Press. (lb./sq. in.) | Thickness (mils) | Weight (oz./sq. yd.) | Percent Void Content | Leather PV | Tensile (lb./sq. in.) | Elongation (percent) | Modulus (lb./sq. in.) | Tongue Tear (lbs.) |
|---|---|---|---|---|---|---|---|---|---|---|
| a | 68/32 | 5,000 | 18 | 13.1 | 18 | --- | 2,995 | 25 | 44,843 | 9.0 |
| b | 68/32 | 5,000 | 26 | 13.8 | 40 | --- | 2,318 | 21 | 45,872 | 9.0 |
| c | 84/16 | 2,570 | 14 | 10.8 | 14 | 1,804 | 4,301 | 17 | 53,976 | 8.0 |
| d | 84/16 | 333 | 20 | 11.1 | 36 | 8,057 | 1,744 | 12 | 29,654 | --- |
| e | 50/50 | 408 | *14 | 9.0 | 30 | 2,895 | 2,634 | 30 | 25,154 | --- |
| f | 50/50 | 408 | *33 | 13.3 | 55 | 10,862 | 2,568 | 29 | 17,422 | --- |
| g | 50/50 | 24.5 | *23 | 13.3 | 36 | 4,426 | 2,462 | 28 | 22,040 | 14.0 |
| h | 50/50 | 8.2 | *31 | 14.7 | 47 | 6,342 | 3,022 | 29 | 19,864 | 10.6 |
| i | 50/50 | 200 | *15 | 6.6 | 51 | --- | --- | --- | --- | 9.6 |
| j | 50/50 | 408 | *51 | 23.1 | 50 | 4,954 | 2,718 | 26 | 21,234 | --- |
| k | 51/49 | 408 | *44 | 14.3 | 65 | --- | 1,412 | 26 | 11,242 | 10.6 |
| l | 56/44 | 100 | *26 | 13.1 | 42 | --- | --- | --- | --- | 6.0 |

*Plied mats used and product split after pressing.

EXAMPLE XVI

Plied polyhexamethyleneadipamide mats were impregnated with a plasticized 95/5 vinyl chloride/vinyl acetate copolymer as described in Example II to give a fiber/binder ratio of 67/33 at a weight of 11.25 oz./sq. yd. After coagulation in water and drying, the plied impregnated mats were pressed 10 minutes at 160° C. and contact pressure, and finally split. There was thus obtained a 25 mil thick, pliable, permeable, leather-like product with about 50% void content which exhibited a leather PV of 11,170, a resistance to penetration by liquid water of about 450 flexes average, a tongue tear strength of 4.2 pounds, and a Schiltknecht flex life of about 100,000.

A similar experiment varying only in that the pressing was conducted at 1400 lb./sq. in. using 60 mil shims, resulted in the formation, after splitting of a 30 mil thick, pliable, permeable, leather-like product, weighing 13.95 oz./sq. yd. with about 48% void content, which exhibited a leather PV of 9217, a resistance to liquid water penetration of about 350 flexes average, a tensile strength of 2144 lb./sq. in., an elongation of 16%, a tongue tear strength of 5.6 pounds, and a Schiltknecht flex life of about 280,000 average.

EXAMPLE XVII

Plied polyhexamethyleneadipamide mats impregnated with a curable polychloroprene composition as in Example III with a fiber/binder ratio of 67/33 were coagulated in methanol, dried, cured 40 minutes at 155° C. and 200 lb./sq. in., using 60 mil shims, and finally split. There was thus obtained a 32 mil thick, pliable, permeable, leather-like product weighing 13.1 oz./sq. yd.

with about 56% void content, which exhibited a resistance to liquid water penetration of greater than 40,000 flexes, a tensile strength of 2018 lb./sq. in., an elongation of 17%, a modulus of 29,718 lb./sq. in., a tongue tear strength of 5.1 pounds, and a Schiltknecht flex life of 57,000.

EXAMPLE XVIII

Mats prepared as described in Example I were plied, impregnated with the curable chlorosulfonated polyethylene composition described in Example I to give a fiber/binder ratio of 59/41, and the binder coagulated in methanol. After drying, the plied, impregnated mats were cured 10 minutes at 170° C. and 200 lb./sq. in., and finally split. There was thus obtained a 23 mil thick, pliable, permeable, leather-like product, weighing 15.5 oz./sq. yd., which exhibited a leather PV of 4832, a tensile strength of 6578 lb./sq. in., an elongation of 26%, and a modulus of 48,266 lb./sq. in.

Similar experiments carried out at different pressures led to the formation of pliable, permeable, leather-like products with the following properties:

*Table II*

| | Curing Pressure | Thickness | Weight (oz./sq. yd.) | Void Content, percent | Leather PV | Tensile (lb./sq. in.) | Elongation (percent) | Modulus (lb./sq. in.) |
|---|---|---|---|---|---|---|---|---|
| a | 100 | 22 | 12.1 | 42 | (2) | ---- | 33 | 29,094 |
| b | 8.2 | 25 | 11.9 | 50 | 17,446 | 4,251 | ---- | 51,019 |
| c | 1 408 | 25 | 15.9 | 33 | 8,246 | 5,635 | 27 | |

1 Using 45 mil shims.
2 Highly air permeable.

EXAMPLE XIX

Other plied impregnated mats prepared as described in Example XVIII with a 60/40 fiber/binder ratio were cured 10 minutes at 170° C. and 408 lb./sq. in. pressure using 75 mil shims and finally split. There was thus obtained a 37 mil thick, pliable, permeable, leather-like product, weighing 13.5 oz./sq. yd., with a 62% void content, which exhibited a leather PV of 17,009, a tensile strength of 2625 lb./sq. in., an elongation of 29%, and a modulus of 22,809 lb./sq. in.

A similar experiment carried out with a like plied impregnated mat of 63/37 fiber/binder ratio using no shims resulted after splitting in the formation of a 15 mil thick, pliable, permeable, leather-like product, weighing 9.9 oz./sq. yd., with a 30% void content, which exhibited a leather PV of 5485, a tensile strength of 4638 lb./sq. in., an elongation of 17%, and a modulus of 52,771 lb./sq. in.

It will be understood that the above examples are merely illustrative.

The synthetic linear condensation polymers adapted for use as the structural fiber in the instant product include synthetic linear condensation polyamides, polyesters, polyester-amides, or mixtures or blends thereof.

A particularly suitable class of such synthetic linear condensation polymers, because of the readier availability of intermediates necessary thereto, include the synthetic linear condensation polyamides prepared from the dibasic carboxylic acids and amino compounds having two amino hydrogen-bearing amine groups, wherein the two carboxyl groups and the two amino hydrogen-bearing amine groups are separated by divalent organic radicals, free of active hydrogen and preferably solely hydrocarbon in nature. Specific examples of such linear condensation polymers include polytetramethylenesebacamide, polyethyleneterephthalamide and polydodecamethyleneadipamide. The synthetic linear condensation polyamides also include those prepared from the amino hydrogen-bearing amino substituted carboxylic acids, e. g., the alpha-amino carboxylic acids, the epsilon-aminocarboxylic acids having a five carbon main chain, and the like. The latter type wherein the hydrogen-bearing amine group is on the omega carbon of the carboxylic acid chain are preferred. Specific examples of such polyamides include poly-D-, or -L-, or -DL-alanine, poly-D-, or -L-, or -DL-leucine, and poly-epsilon-aminocaproic acid.

Another similarly suitable class of the synthetic linear condensation polymers are the polyesters, i. e., those polymers containing a plurality of recurring intrachain ester or acyloxy linkages, particularly those containing a plurality of recurring intrachain carboxy ester linkages. Specific examples of such polymers which can be prepared, analogous to the polyamides, by condensation between essentially equimolar proportions of dibasic acids and dihydroxy hydrogen-bearing polyols, particularly those which apart from the carboxyl and hydroxyl groups are solely hydrocarbon, include polydodecamethyene adipate, polyethylene sebacate, polyhexamethylene oxalate, and the like, particularly the terephthalates, which have excellent hydrolytic stability.

Also included in this class of linear condensation polyesters are those prepared from the monohydroxyl hydrogen-bearing alcohol substituted monocarboxylic acids, preferably those wherein the hydrogen-bearing hydroxyl group is on the omega carbon of the carboxylic acid chain, e. g., the alpha-hydroxycarboxylic acids, the epsilon-hydroxycarboxylic acids of five carbons in the main chain, and the like. Specific examples of such polyesters include poly-D-, or -L-, or -DL-lactic acid, poly-D-, or -L-, or -DL-mandelic acid, and poly-epsilon-hydroxycaproic acid.

Fibers well adapted for use in the product of this invention can be made from blends of the foregoing condensation polymers such as blends of the polyesters with the polyamides, the polyesters with the polyester-amides, and the polyamides with the polyester-amides. It is essential that these fibers be oriented and, as previously mentioned, both the length and denier of fiber influence the quality of the leather-like product.

The present invention permits the selection of the polymeric component of the binder from a wide variety of polymers but it must be chemically dissimilar and incompatible with the particular synthetic linear condensation polymer forming the structural fiber with with the binder is to be used, and, in addition, the polymeric binder must melt or be reducible to a flowable composition at a temperature below the softening point of the structural fiber polymer.

The addition polymers containing in combined form the ethylenically unsaturated monomers, including both the mono- and diene-type monomers, are particularly adapted as the polymeric component of the binder. Examples of such polymers are polyethylene and the lower monoene and diene solely hydrocarbon polymers such as polypropylene, polyisobutylene, polybutene-2, polyisoprene, including both synthetic and natural, and the like; the negatively substituted monoene and diene polymers such as those from vinyl chloride, 2,3-dichlorobutadiene, and vinyl acetate; as well as copolymers from such monomers including both the hydrocarbon and negatively substituted monoene and diene monomers such as butadiene/styrene, tetrafluoroethylene/ethylene, tetrafluoroethylene/chlorotrifluoroethylene, and vinyl chloride/vinyl acetate copolymers.

The most preferred class of polymers for use in the binder are the vinylidene polymers and copolymers including both the monoene and diene types. Examples of such polymers are the various vinylidene hydrocarbon polymers and copolymers such as polyethylene, polyisobutylene, polybutadiene, and polyisoprene; the various negatively substituted polymers and copolymers such as the vinylidene halide copolymers, e. g., vinylidene chloride, the various vinyl halide polymers such as the vinyl chloride and vinyl fluoride polymers and copolymers and their derivatives such as the halogenated vinyl and vinylidene polymers, e. g., chlorinated polyethylene and chlorinated polyvinyl chloride; the various vinylidene polymers wherein one or both of the free valences of the 2-carbon of the vinylidene group (CH$_2$=C>) are bonded directly to carboxyl groups or groups hydrolyzable to carboxyl groups either directly to the acyl carbon or the oxy oxygen thereof, such as polymers of the various vinylidene esters, including vinyl acetate, ethylidene diacetate, vinyl propionate, and vinyl butyrate; the vinylidene carboxylic acids and their derivatives such as acrylic acid, methacrylic acid, methyl methacrylate, acrylonitrile, and methacrylamide.

Also included in this most preferred class are the various copolymers of such vinylidene monomers, including specifically the various monoene/diene copolymers of this class such as the butadiene-1,3/acrylonitrile and 2,3-dichlorobutadiene - 1,3/2 - chlorobutadiene-1,3 copolymers; the various monoene/vinylidene copolymers such as the extremely important commercially vinyl chloride and vinylidiene chloride copolymers, e. g., vinyl chloride/vinyl acetate, vinyl chloride/vinylidene chloride, vinylidene chloride/vinyl acetate, and vinyl chloride/vinyl acetate/acrylonitrile copolymers; the various vinylidene hydrocarbon negatively substituted vinylidene copolymers, e. g., ethylene/vinyl acetate and the hydrolyzed products therefrom; ethylene/vinyl chloride, butadiene/methyl methacrylate, butadiene/acrylonitrile, and isoprene/acrylonitrile copolymers.

In the case of those binder components containing in combined form appreciable proportions of diene monomers, particularly the vinylidene diene monomers, it is frequently desirable to have present in the solution, dispersion, or bulk treating material, whichever is used, suitable amounts of chemical agents for effecting under controlled conditions, after the fiber has been impregnated with the binder and the whole mat suitably partially consolidated, the cross-linking of the dienecopolymer component. These chemical systems for effecting such controllable cross-linking are well known in the rubber art and, in the case of the diene hydrocarbon polymers and copolymers, normally function through a disulfide formed cross-link arising from the presence of mercaptans and/or sulfur in the diene polymer composition, and, in the case of the negatively substituted diene polymers and copolymers, such as the 2-chlorobutadiene-1,3 (chloroprene) polymers and copolymers, normally function through halogen removal as effected by the presence in the diene polymer composition of appreciable quantities of metallic oxides such as zinc or magnesium oxides.

In many instances it is desirable to have present in the binder composition appreciable proportions of plasticizers for the binder polymers. This is particularly important in the case of the vinylidene resins, particularly the higher molecular weight, negatively substituted vinylidene polymers and copolymers, such as the vinyl chloride/vinylidene chloride, vinyl chloride/vinyl acetate copolymers, so as to produce leather-like products of good drape and high pliability. The presence of these plasticizers in the case of such polymers tends to prevent the formation of leather-like products of too great stiffness. Such plasticizers are by now well recognized in the art.

Examples of such plasticizers are the higher molecular weight mono- or dicarboxylic acid/alcohol or polyolesters such as glycerol monooleate, glycerol sebacate, ethyleneoctanoate, and the like; or the lower molecular weight polyesters and polyethers such as the polyalkylene oxides and their esters, e. g., polyethylene oxide, methoxypolyethyleneglycol; the lower molecular weight condensation polyesters such as polyethyleneglycol adipate and the like.

The blend of structural fiber and binder can be prepared for consolidation by various methods. Thus, mats of structural fiber can be prepared by paper-making techniques, by carding, or by deposition from an air stream; several such mats can be prepared separately and subsequently plied. Mats thus prepared are light and fluffy with a low bulk density and it is necessary that the mat, prior to impregnation and consolidation, have a bulk density not greater than about 0.5, and preferably not greater than about 0.3, to assure sufficient permeability in the end product. The binder, if used in fibrous form, can conveniently be incorporated during such mat preparation. Alternatively, solutions or dispersions of binder can be used to impregnate mats comprising solely structural fiber—it, of course, being necessary to avoid solvents or vehicles which attack the structural fiber. For the purpose of imparting color to the product, either dyes or pigments can be incorporated in the binder compositoin.

It is essential that the binder be in a discontinuous or dispersed state in the fiber matter prior to the pressing or consolidation step. Also, the distribution of the binder throughout the matter should be relatively uniform. Binders which are in the form of continuous films cannot be used in this invention because the consolidation step will then fail to yield a permeable product.

As shown in many of the examples, the product obtained subsequent to the consolidation step is split to give a product similar to leather in having a "grain" side and a "flesh" side. A product having a construction even closer to natural leather, i. e., a binder rich "skin" or "grain" side and a fiber rich "flesh" side may be achieved in several ways. It may be done by plying webs of suitably varied fiber/binder ratios. It may also be accomplished by controlling the migration of binder during drying of webs impregnated with solutions or dispersions of binder.

Thus, a freshly-impregnated web possesses an essentially homogeneous binder distribution and this can be retained, if desired, by immobilizing the dispersion through heating, cooling, or treatment with a precipitating or coagulating agent. If such immobilization is deferred, the binder tends to migrate toward the outer surfaces of the product as the solvent or vehicle evaporates, and binder immobilization can then be carried out at any desired stage of migration. Subsequent controlled consolidation will result in a product which is binder rich on both surfaces and fiber rich in the interior, a construction of value for certain uses. However, if such a product be split at or near the middle, a very leather-like product results, with a binder rich "grain" and a fiber rich "flesh" side. Such splitting can be accomplished on conventional leather-splitting machines, or by simple mechanical separation, particularly if a suitable ply-line has been established by plying of two or more webs of structural fiber either before or after the step of impregnating with the binder.

Products thus prepared are particularly susceptible to boarding treatments, whereby a leather-like surface grain is imparted by sharply creasing and rolling the "grain" side.

The consolidation step is conducted by pressing the impregnated mat at a temperature which is above the melting or flow temperature of the polymeric binder but below, and preferably at least 10° C. below, the softening or deformation temperature of the structural fiber component. Flat plate or roller presses can be used and these can, if desired, be grained or embossed so as to impart a leather-like surface to the product. This consolidation must be controlled to give a desired void content within the range hereinbefore stated, the actual pressure used not being critical so long as the end product has the requisite void content. Depending on the character of the binder-carrying matter of non-woven fibers, the pressure used in consolidating can vary from substantially atmospheric pressure (merely the contact pressure of plate or roller) to pressures of several thousand lbs./sq.in.

The range of proportions of structural fiber and polymeric binder in conjunction with the interrelated range of interconnecting void space in the product is a vital factor in arriving at an acceptable leather-like product according to the present invention. That is, on a weight basis, the product must consist of 40% to 85% of structural fiber and the remainder, 60% to 15%, polymeric binder, disregarding optional additives as dyes, pigments, and the like which will in any ordinary event be relatively minor, and the maximum volume percent of void space must not be over 70% nor the minimum below the volume percent expressed by the formula 3000 (weight percent fiber)$^{-1}$-30. This means that the minimum percent void space when employing the maximum proportion (85%) of structural fiber is 5.3% and, when employing the minimum proportion (40%) of structural fiber, is 45%. Further, for each specific proportion of structural fiber within the permitted range of 40% to 85%, there will be a specific minimum percent void space which will be different for each specific proportion of structural fiber.

For shoe uppers, which require a rather critical combination of permeability and physical properties, the volume percent of interconnecting void space will preferably lie within the narrower range defined by the expression $$\frac{3000}{\text{Wgt. percent of fibre}} - (25 \pm 5)$$

Employing the maximum percent fiber component (85%) which allows the minimum percent void space, the said void space can range from 5.3% to 15.3%. Employing the minimum percent fiber component (40%) which permits the maximum percent void space, the said void space can range from 45% to 55%. This relationship required in the preferred leather-like products of this invention particularly useful for shoe uppers is quite critical in that for any given percent fiber content it defines a 10% range within which the percent void space of the product should fall.

In preparing a leather-like product in accordance with this invention, a fiber/binder ratio of the particular ingredients involved is first established within the stated limits. The durability, drape, strength, and appearance desired in the end product will be taken into consideration. A desired leather PV is also established, depending on the intended use. For shoe uppers, the optimum permeability is about 2000 g./100 m.²/hr. as below this value wearing comfort in hot weather is poor and above it, although comfort is improved, toughness, fullness, and scuff resistance are sacrificed. It has been found that permeability varies with void content and with fiber/binder ratio in a logarithmic relationship such that a leather PV of 2000 is obtained when the volume percent of void space lies in the range defined by the formula $$\frac{3000}{\text{Wgt. percent of fibre}} - (25 \pm 5)$$

If the product then is to be used for shoe uppers, the already determined weight percent of fiber is substituted in the above formula to arrive at a narrow range of volume percent values of void space or, more conveniently, an average value for the volume percent of void space at which adequate comfort combined with other favorable properties will be obtained. Knowing the densities of the components, it is then possible to calculate the bulk density corresponding to this void content. This bulk density, in turn, defines the desired thickness or degree of consolidation of the product. This thickness is achieved in the pressing step by controlling the time, temperature, and pressure which is applied, and, if desired, by using shims to prevent over-consolidation. The times, temperatures, pressures, and shims necessary to achieve a desired thickness will vary both with the flow characteristics of the binder, and with the nature of the pressing equipment which is used.

As an example of such a calculation, assume a permeable, synthetic, leather-like product suitable for shoe uppers and consisting of a polyhexamethylenedipamide fiber component and a plasticized polyvinylchloride binder component in the ratio 50/50 is desired at a weight of 10 oz./sq. yd. From the formula above, percent void content equals $$\frac{3000}{50} - (25 \pm 5) = 30\% \text{ to } 40\%$$

or an average of 35% voids. Since the two components have an absolute density of 1.2, the bulk density corresponding to 35% void volume is given by the expression $$\frac{(100-35)(1.2)}{100} = 0.78 \text{ g./cc.}$$

In the leather and allied fields the products are conventionally described by weight and thickness in units of oz./sq. yd. and mils (0.001 in.). Accordingly, in calculating the thickness of the product in question to give the required bulk density of 0.78 g./cc., as obtained above in the handier metric system, at a weight of 10 oz./sq. yd., simple arithmetrical conversion to equivalent units is needed in the fundamental relationship that $$\text{Thickness} = \frac{\text{weight/unit area}}{\text{bulk density}}$$

Thus, the requisite thickness here in mils is given by the expression:

$$10.0 \text{ oz./sq. yd. } \frac{\frac{28.35 \text{ g./oz.}}{8361.31 \text{ sq. cm./sq. yd.} \times 0.00254 \text{ cms./mil}}}{0.78 \text{ g./cc.}}$$

which reduces to $$\frac{(10.0)(1.3347)}{0.78} = 17.1 \text{ mils}$$

In cases where excellent softness and wearing comfort is desired, or where somewhat less than the maximum of toughness and scuff resistance can be tolerated, it is possible to control the consolidation to give products of lower bulk density, and hence higher permeability than that defined by the equation. However, it has been found that in any case it is necessary that the void content be at least $$\frac{3000}{\text{Wgt. percent of the fiber}} - 30$$

and not greater than 70%, since above this range the mechanical properties of the products are no longer leather-like, while below it they are uncomfortable in hot weather, stiff, and sometimes even brittle.

Products of any desired weight per unit area can be prepared by the process of this invention. In contrast to continuous films and foils, wherein there is usually an inverse relationship between film thickness and permeability to water vapor such that the product thereof is a constant, the non-continuous products of this invention surprisingly exhibit a permeability to water vapor which is largely independent of thickness. Thus, a thick product with a given fiber/binder ratio and void content will allow the permeation of practically as much water vapor as will a thin one of similar construction. For shoe upper uses, the most leather-like products are obtained at a weight of 5–20 oz./sq. yd., preferably at about 8–12 oz./sq. yd.

An advantage of this invention is that it provides a leather-like product combining the essential and desirable properties of natural leather to a degree heretofore unattained. A further advantage is that the product of this invention possesses the quality of leather PV to an exceptional degree without sacrifice of other properties requisite in an acceptable leather-like product for protective clothing outlets. Still further, the process of this invention provides an economical and practical means of preparing this product with uniform quality, said process being well adapted for either batch or continuous operations.

As contrasted to natural leather, the instant product has a great advantage in that it can be readily colored uniformly throughout so as not to exhibit marked and undesirable color changes when scuffed or abraded. This product not only can be dyed after finishing but, also, can be colored by using pre-dyed or pre-pigmented structural fibers and/or by incorporating dyes or pigments in the binder dispersions. Further, the instant product can be made entirely uniform in its properties whereas a notorious characteristic of natural leather, even samples from the same hide, is the lack of uniformity in various physical properties.

As many apparently widely different embodiments of this invention may be made without departing from the spirit and scope thereof, it is to be understood that the invention is not limited to the specific embodiments thereof except as defined in the appended claims.

The invention claimed is:

1. A leather-like product essentially comprising, by weight, 40% to 85% of matted, oriented fibers of a synthetic linear condensation polymer from the group consisting of polyamides, polyesters, polyester-amides in the molecular structure of which there are solely hydrocarbon groups between the functional groups, said fibers being from 0.5 to 4.0 inches long, from 1 to 3 denier/filament, and softening above 150° C., and, distributed therethrough, 60% to 15% of a polymeric binder in which the polymeric component is a vinylidene polymer, said polymeric binder being incompatible with said linear condensation polymer and melting above 90° C. and at least 10° C. below the softening temperature of said linear condensation polymer, said product containing a volume percent of interconnecting void space distributed therethrough at least equal to 3000 (weight percent fiber)$^{-1}$—30 and not greater than 70%.

2. A leather-like product as set forth in claim 1 wherein the synthetic linear condensation polymer of which said matted fibers are composed, is a polyamide having only one recurring condensation unit.

3. A leather-like product as set forth in claim 1 wherein the synthetic linear condensation polymer of which said matted fibers are composed, is a polyester having only one recurring condensation unit.

4. A leather-like product as set forth in claim 1 wherein said matted fibers comprise 50% to 70% by weight of said product and said polymeric binder comprises 50% to 30% by weight of said product.

5. A leather-like product as set forth in claim 2 wherein said matted fibers comprise 50% to 70% by weight of said product and said polymeric binder comprises 50% to 30% by weight of said product.

6. A leather-like product as set forth in claim 5 wherein the volume percent of interconnecting void space distributed therethrough is within the range defined by the expression 3000 (weight percent fiber)$^{-1}$—(25±5).

7. A leather-like product as set forth in claim 1 wherein the volume percent of interconnecting void space distributed therethrough is within the range defined by the expression 3000 (weight percent fiber)$^{-1}$—(25±5).

8. Process of preparing a leather-like product which comprises forming a mat essentially comprising, by weight, 40% to 85% of non-woven, oriented fibers of a synthetic linear condensation polymer from the group consisting of polyamides, polyesters, and polyester-amides in the molecular structure of which there are solely hydrocarbon groups between the functional groups, said fibers being from 0.5 to 4.0 inches long, from 1 to 3 denier/filament, and softening above 150° C., and 60% to 15% of a polymeric binder in which the polymeric component is a vinylidene polymer, distributed therethrough, said polymeric binder being incompatible with said linear condensation polymer and melting above 90° C. and at least 10° C. below the softening temperature of said linear condensation polymer, and said mat having a bulk density in the absence of polymeric binder of less than about 0.5, and pressing said mat at a temperature above the melting temperature of said polymeric binder but below the softening temperature of said linear condensation polymer until a product is formed containing a volume percent of interconnecting void space distributed therethrough at least equal to 3000 (weight percent fiber)$^{-1}$—30 and not greater than 70%.

9. Process of preparing a leather-like product which comprises forming a mat of non-woven, oriented fibers of a synthetic linear condensation polymer from the group consisting of polyamides, polyesters, and polyester-amides in the molecular structure of which there are solely hydrocarbon groups between the functional groups, said fibers being from 0.5 to 4.0 inches long, from 1 to 3 denier/filament, and softening above 150° C., and said mat having a bulk density of less than about 0.5, impregnating said mat with a liquid polymeric binder composition and removing the liquid component of said composition whereby a polymeric binder in which the polymeric component is a vinylidene polymer, said polymeric binder being incompatible with said linear condensation polymer and melting above 90° C. and at least 10° C. below the softening temperature of said linear condensation polymer, is distributed throughout said mat in the proportion, by weight, of 40% to 85% of said fibers and 60% to 15% of polymeric binder, and pressing said mat at a temperature above the melting temperature of said polymeric binder but below the softening temperature of said linear condensation polymer until a product is formed containing a volume percent of interconnecting void space distributed therethrough at least equal to 3000 (weight percent fiber)$^{-1}$—30 and not greater than 70%.

10. A process as set forth in claim 9 wherein said mat is pressed at a temperature above the melting temperature of said polymeric binder but at least 10° C. below the softening temperature of said fibers until a product is formed containing a volume percent of interconnecting void space distributed therethrough at least equal to 3000 (weight percent fiber)$^{-1}$—(25±5).

11. A process as set forth in claim 10 wherein the synthetic linear condensation polymer of which said fibers are composed, is a polyamide having only one recurring condensation unit.

12. A process as set forth in claim 10 wherein the synthetic linear condensation polymer of which said fibers are composed, is a polyester having only one recurring condensation unit.

References Cited in the file of this patent

UNITED STATES PATENTS

| Number | Name | Date |
|---|---|---|
| 2,336,797 | Maxwell | Dec. 14, 1943 |
| 2,482,062 | Hanson | Sept. 13, 1949 |
| 2,530,441 | Reinhardt et al. | Nov. 21, 1950 |
| 2,543,101 | Francis | Feb. 27, 1951 |
| 2,626,214 | Osborne | Jan. 20, 1953 |